(12) United States Patent
Li et al.

(10) Patent No.: US 9,812,945 B2
(45) Date of Patent: Nov. 7, 2017

(54) CIRCUIT STRUCTURE FOR ENHANCING EFT IMMUNITY OF PRIMARY SIDE CONVERTER

(71) Applicant: Wuxi Chipown Micro-electronics Limited, Wuxi, Jiangsu (CN)

(72) Inventors: Haisong Li, Jiangsu (CN); Ping Tao, Jiangsu (CN); Changshen Zhao, Jiangsu (CN); Yangbo Yi, Jiangsu (CN)

(73) Assignee: Wuxi Chipown Micro-Electronics, Limited (CN)

( * ) Notice: Subject to any disclaimer, the term of this patent is extended or adjusted under 35 U.S.C. 154(b) by 29 days.

(21) Appl. No.: 14/880,943

(22) Filed: Oct. 12, 2015

(65) Prior Publication Data

US 2016/0336851 A1 Nov. 17, 2016

(30) Foreign Application Priority Data

May 13, 2015 (CN) .......................... 2015 1 0243735

(51) Int. Cl.
*H02M 3/335* (2006.01)
*H02M 1/32* (2007.01)
*H02M 1/44* (2007.01)
*H02M 1/00* (2006.01)

(52) U.S. Cl.
CPC .............. *H02M 1/32* (2013.01); *H02M 1/44* (2013.01); *H02M 3/335* (2013.01); *H02M 3/33507* (2013.01); *H02M 3/33523* (2013.01); *H02M 2001/0009* (2013.01); *H02M 2001/0035* (2013.01); *Y02B 70/16* (2013.01)

(58) Field of Classification Search
CPC ............................. H02M 3/156; H02M 3/335
USPC ........................................................ 323/282
See application file for complete search history.

(56) References Cited

U.S. PATENT DOCUMENTS

| 2008/0298099 | A1* | 12/2008 | Huang | H02M 1/32 363/50 |
| 2009/0141520 | A1* | 6/2009 | Grande | H02M 3/33523 363/21.16 |
| 2014/0043867 | A1* | 2/2014 | Sugawara | H02M 3/33523 363/21.15 |

* cited by examiner

*Primary Examiner* — Jue Zhang
*Assistant Examiner* — Trinh Dang
(74) *Attorney, Agent, or Firm* — Colin P. Cahoon; Krista Y. Chan; Carstens & Cahoon, LLP

(57) ABSTRACT

The present disclosure relates to a circuit structure for enhancing EFT immunity of primary side converter, including a power ground and a feedback voltage detecting block, a feedback current detecting block, a controller, a PWM driving block, a high voltage starting block, a starting unit, a circuit for enhancing EFT immunity of primary side converter, a power MOS transistor, and an OR gate configured to perform a logical OR of an off-time calculated theoretically and an off-time output by an off-time control block. The present disclosure enhances EFT immunity effectively and improves the dynamic characteristics of the primary side converter.

5 Claims, 8 Drawing Sheets

CIRCUIT STRUCTURE FOR ENHANCING EFT IMMUNITY OF PRIMARY SIDE CONVERTER

TECHNICAL FIELD

The present disclosure relates to a circuit structure for enhancing EFT (Electrical Fast Transient) immunity of a primary side converter. The circuit structure can be applied to flyback converter operating in Discontinuous-Conduction-mode (DCM), and it belongs to the technical field of power semiconductors.

BACKGROUND

As shown in FIG. 1, the chip structure of the conventional primary side regulated converter mainly includes a feedback voltage detecting block 103, a feedback current detecting block 106, a controller 104, a PWM driving block 105, a power supply unit 101 and a HV start-up block 102. Figure (FIG. 2 is a simplified conventional diagram illustrating a switching power converter. The power converter mainly includes a bridge rectifier D0, a filtering capacitor C1, a transformer TR1, a power chip IC1, SW pin of power chip IC1 connected with the primary winding of the transformer, a CS sampling loop connected with the CS pin of power chip IC1, a DC output stage connected with the secondary winding of the transformer, a VDD power supply loop and a feedback loop connected with the auxiliary winding of the transformer. The operating principle of the power converter is as follows: when the output voltage $V_{out}$ of the DC output stage is lower than the target voltage, the feedback voltage $V_{SENSE}$ decreases, the power supply chip IC1 increases the duty cycle of the switching frequency, and prolongs the on-time of the switching transistor, so as to transfer more energy to the secondary winding of the transformer and raise the output voltage $V_{out}$; when the output voltage $V_{out}$ of the DC output stage is higher than the target voltage, the feedback voltage $V_{SENSE}$ increases, the power supply chip IC1 decreases the duty cycle of the switching frequency, and shortens the on-time of the switching transistor, so as to transfer less energy to the secondary winding of the transformer and decrease the output voltage $V_{out}$.

Although the above operation mode can realize stable output, it has worse anti-interference performances for various kinds of transient disturbances caused by transient processes during operations, such as turning on or turning off an inductive load, contact bounce of a relay, and so on. An EFT test is to simulate such disturbances. As shown in FIG. 3, the concrete waveforms during an EFT test are present as a limited number of clear and distinguishable pulse sequences, having characteristics of large transient amplitude, short rise time, high repetition rate and low energy. The effects of the pulse sequences on the operation of the power converter are shown through the waveforms in FIG. 4. Since the pulse sequences have effects on the feedback voltage $V_{SENSE}$, the chip will sample a false value of feedback voltage $V_{SENSE}$ and make a wrong judgment to decrease the operating frequency of the chip, thereby decreasing the output voltage. When the pulse amplitude reaches a certain value, the sampled value of the feedback voltage $V_{SENSE}$ will be too large, and the chip outputs the allowable minimum frequency according to the false value of feedback voltage $V_{SENSE}$, as a result, the output voltage is decreased to be lower than the acceptable output voltage, which will influence the regular service of the chip; the concrete wave forms are shown in FIG. 5.

SUMMARY

In order to overcome the defects existing in the prior art, the present disclosure provides a circuit structure for enhancing EFT immunity of primary side converter, so as to improve the dynamic characteristics of the power system and ensure that the output voltage of the power system will not drop to a value beyond the acceptable range.

The objects of the present disclosure are achieved by the following technical schemes:

The circuit structure for enhancing EFT immunity of primary side converter, comprises a power ground and a feedback voltage detecting, a feedback current detecting block, a controller, a PWM driver, a HV start-up block, a start-up unit, a circuit for enhancing EFT immunity of primary side converter, a power MOS transistor, and an OR gate configured to perform a logical operation OR of an off-time calculated theoretically and an off-time output by an off-time control block;

The circuit for enhancing EFT immunity of primary side converter comprises a $V_{SENSE}$ abrupt change detecting block, the off-time control block, an OCP threshold value adjusting block and a timing block; an input of the $V_{SENSE}$ abrupt change detecting block is connected with a feedback voltage $V_{SENSE}$ terminal, outputs of the $V_{SENSE}$ abrupt change detecting block are respectively connected with an input of the start-up unit, an input of the OCP threshold value adjusting block and an input of the timing block; inputs of the off-time control block are connected with outputs of the timing block, and an output of the off-time control block is connected with an input of the OR gate; another input of the OCP threshold value adjusting block is connected with an output of the controller, and an output of the OCP threshold value adjusting block is connected with an input of the feedback current detecting block; an input of the feedback voltage detecting block is connected with the $V_{SENSE}$ terminal, and an output of the feedback voltage detecting block is connected with an input of the controller; outputs of the controller are respectively connected with an input of the OCP threshold value adjusting block and another input of the OR gate; an output of the OR gate is connected with an input of the PWM driver; an output of the PWM driver is connected with the gate of the power MOS transistor; the drain of power MOS transistor is connected with the HV start-up block and a high voltage port SW; the source of power MOS transistor is connected with the feedback current detecting block and a current feedback port $I_{SENSE}$; the feedback current detecting block is also connected with the OCP threshold value adjusting block, and the current feedback port $I_{SENSE}$; the HV start-up block is respectively connected with the high voltage port SW and a power port VDD.

Further, the feedback current detecting block is configured to timely monitor current of the primary side when the power MOS transistor is on; the feedback voltage detecting block is configured to timely monitor feedback voltage $V_{SENSE}$ when the power MOS transistor is off; the controller is configured to calculate on-time and off-time of the power MOS transistor according to the feedback voltage and feedback current; the circuit for enhancing EFT immunity of primary side converter is configured to select real off-time and on-time of the power MOS transistor according to the feedback voltage $V_{SENSE}$; the circuit for enhancing EFT immunity of primary side converter is configured so that, after start-up has been finished, the $V_{SENSE}$ abrupt change detecting block begins to detect feedback voltage $V_{SENSE}$ periodically, once an abrupt change of the feedback voltage $V_{SENSE}$ is detected, it outputs a signal B representing an abrupt increase of signals of the feedback voltage $V_{SENSE}$ or a signal A representing an abrupt decrease of the signals of the feedback voltage $V_{SENSE}$, so as to drive the timing block to operate, and control outputs from the OCP threshold value adjusting block, and further control outputs from the off-time control block; according to selective output signals of the $V_{SENSE}$ abrupt change detecting block, the off-time control block outputs a signal of the off-time of the power MOS transistor according to the output of the timing block, or the OCP threshold value adjusting block outputs an OCP threshold value according to the output of the $V_{SENSE}$ abrupt change detecting block.

Further, the $V_{SENSE}$ abrupt change detecting block is configured to control the start-up unit; before start-up is finished completely, a detecting function of the $V_{SENSE}$ abrupt change detecting block is de-activated, and no information of the feedback voltage $V_{SENSE}$ is detected; after the start-up is finished, the $V_{SENSE}$ abrupt change detecting block detects the feedback voltage $V_{SENSE}$ periodically, and generates the signal A or the signal B according to values of the feedback voltage $V_{SENSE}$; when the detecting block detects an abrupt decrease of the feedback voltage $V_{SENSE}$, the signal A is reversed; when the detecting block detects an abrupt increase of the feedback voltage $V_{SENSE}$, the signal B is reversed.

Further, the timing block comprises a plurality of timers including at least a first timer and a second timer; when the signal B is reversed, the first timer starts to time, and the second timer is reset simultaneously, after timing for a period of time, the timing block generates a control signal 1 to control the off-time control block; when the signal B is restored to an initial value, the second timer starts to time, after timing for a period of time, the timing block generates a control signal 2 to control the off-time control block, and the first timer is reset simultaneously.

Further, the off-time control block is configured to select the off-time of the power MOS transistor according to the signal B, the off-time of a previous cycle, and control signals output by the timing block; the off-time control block limits the maximum off-time of current cycle according to the off-time of the previous cycle, not allowing any abrupt change of the off-time; when the off-time calculated in the current cycle is larger than an allowable off-time, the off-time control block outputs a high level, so as to turn on the MOS power tube; the off-time control block selects the maximum off-time of the power MOS transistor according to signals for abrupt change of the feedback voltage $V_{SENSE}$; when a control signal 2 generated by the timing block is in effect, the maximum off-time is set to be the value Toff_A; when the off-time is greater than Toff_A, the off-time control block outputs a high level, so as to turn on the power MOS transistor; when a control signal 1 generated by the timing block is in effect, the maximum off-time is to be the value Toff_B; when the off-time is greater than Toff_B, the off-time control block outputs a high level, so as to turn on the power MOS transistor; Toff_A is less than Toff_B, and Toff_B is greater than the no load off-time calculated by the controller; when the signal B is its initial value, and when the circuit structure is in start-up and the off-time is less than the allowable off-time, the off-time control block outputs a low level.

Further, the OCP threshold value adjusting block is configured to select an OCP threshold value according to the signal A; when the signal A is reversed, the OCP threshold value is latched as the maximum threshold value, till the signal A is restored to its initial value again; when the signal A is restored to the initial value and when the circuit structure is in start-up, the OCP threshold value control block to output the OCP threshold value calculated by the controller.

Further, the $V_{SENSE}$ abrupt change detecting block comprises a first comparator, a second comparator, a first filter circuit, a second filter circuit, a timing circuit, a first inverter, a first AND gate and a second AND gate; an output of the first comparator is connected with the first filter circuit; an output of the first filter circuit is connected with an input of the timing circuit, also the timing circuit is connected with the first inverter and the first AND gate; an output of the second comparator is connected with the second filter circuit; an output of the second filter circuit is connected with the second AND gate; the first comparator is configured to receive values of the feedback voltage and generate a comparison signal 1; the first filter circuit is configured to filter out disturbances from the comparison signal 1; the timing circuit is configured to time the time width according to the filtered comparison signal 1 and PWM signal, in which the feedback voltage is greater than the reference voltage; the timing circuit is configured to compare the time width with a threshold, if the time width is less than the threshold, the output of the timing circuit is set to be a high level; the first AND gate is configured to generate the signal A according to the CC signal, output level of the timing circuit and a start-up control signal; the second comparator is configured to receive an output signal $EA_{OUT}$ of an operating amplifier and the reference voltage $V_{REF2}$, and generate a comparison signal 2; the second filter circuit is configured to filter out disturbances from the comparison signal 2; the second AND gate is configured to generate the signal B according to the start-up control signal and the comparison signal 2.

Further, the timing block comprises a first timer and a second timer, which are connected in parallel; an input of the second timer is connected with an output of a second inverter.

Further, the off-time control block comprises an arithmetic unit, a logic unit, a maximum off-time selecting unit and an off-time timing and comparing unit; an output of the arithmetic unit is connected with an input of the off-time timing and comparing unit; an output of the logic unit is connected with an input of the maximum off-time selecting unit; an output of the maximum off-time selecting unit is connected with another input of the off-time timing and comparing unit; the off-time timing and comparing unit is configured to select a minor value from an off-time output by the arithmetic unit and maximum off-time output by the maximum off-time selecting unit; and the minor value is selected to be output signal of the off-time control block.

Further, the OCP threshold value adjusting block comprises an OCP threshold value selecting unit; the OCP threshold value selecting unit, according to the signal A, is configured to select the OCP threshold value calculated by a feedback loop or maximum allowable OCP threshold value under current AC Voltage; the value selected is output by the OCP threshold value control block.

The present disclosure has the following substantive features and notable progresses:

The power converter provided with the primary side feedback based power chip of the present disclosure has an effectively enhanced EFT immunity, as well as improved dynamic responses, and effectively enhanced anti-interference performances for various kinds of transient disturbances caused by transient processes during operations, such as turning on or turning off an inductive load, contact bounce of a relay, and so on. The feedback voltage $V_{SENSE}$ is detected periodically, which ensures that the power chip can make a timely response to value changes of the $V_{SENSE}$ and that the output voltage is always within the acceptable range. The off time (non-conducting time) and the on time (conducting time) of power MOS switch are controlled by a specific control block, which speeds up the response of the chip and effectively improves the dynamic characteristics. During the starting-up, the circuit for enhancing EFT immunity of primary side converter is shielded, which ensures that the power system starts normally. The circuit for enhancing EFT immunity of primary side converter is applicable not only to the power chip with integrated power MOS transistor, but also to the power chip with integrated power BJT, the power chip with externally driven power MOS transistor or the power chip with externally driven power BJT.

DETAILED DESCRIPTION OF DISCLOSED EMBODIMENTS

The present disclosure will be described in more details with reference to the accompanying figures and embodiments.

Figure 1:
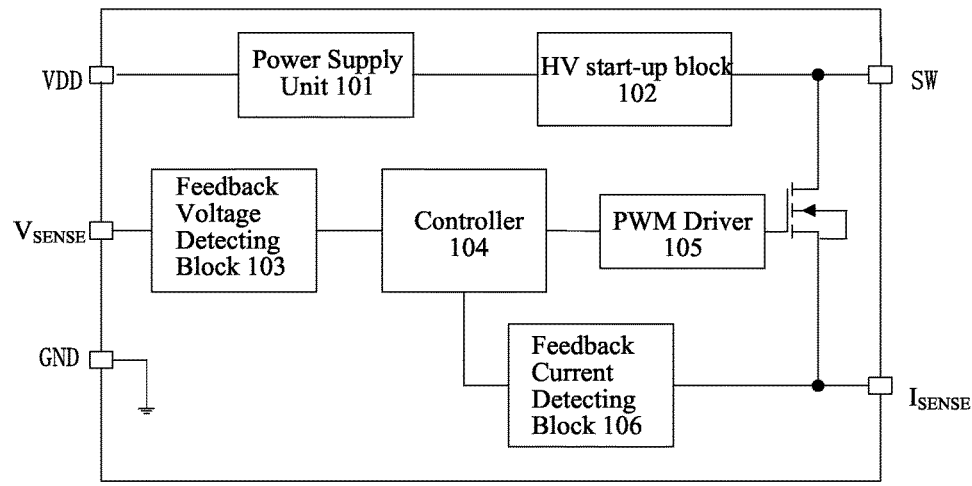
FIG. 1 is a schematic structure diagram of the chip of the existing primary side converter.
Figure 2:
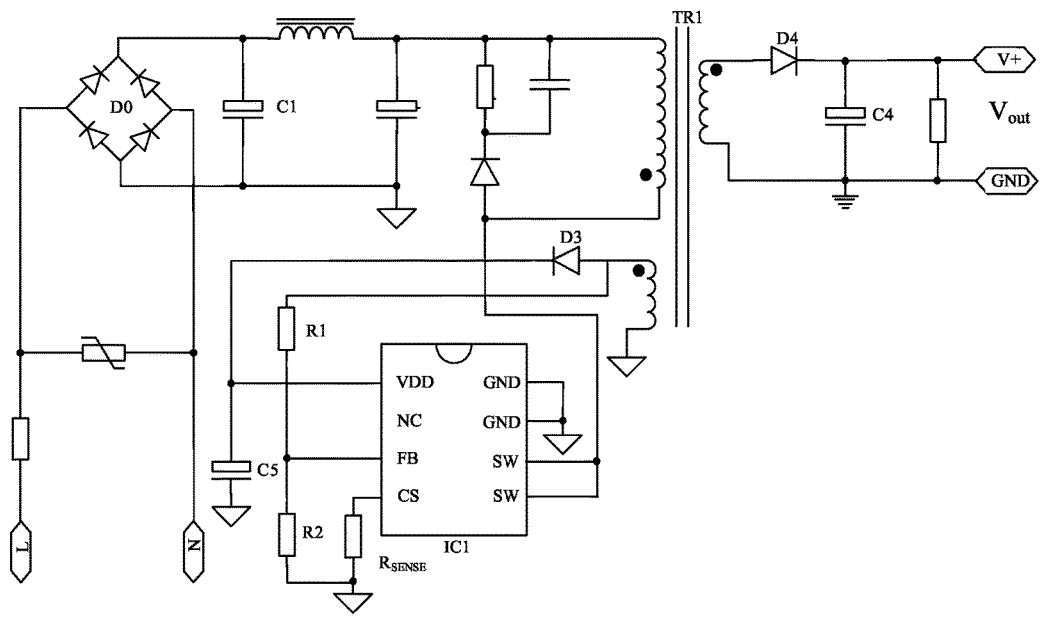
FIG. 2 is a schematic diagram illustrating the system scheme of the chip structure of the existing integrated power transistor.
Figure 3:
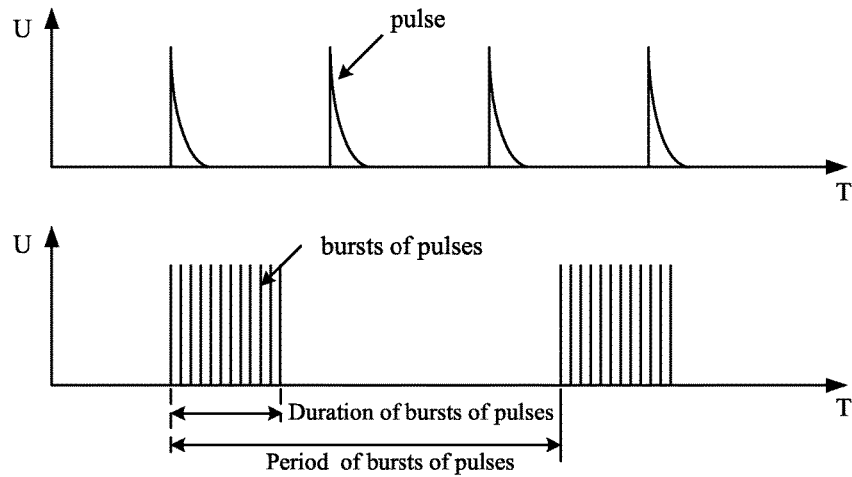
FIG. 3 is a schematic diagram illustrating the bursts of pulses during an EFT test.
Figure 4:
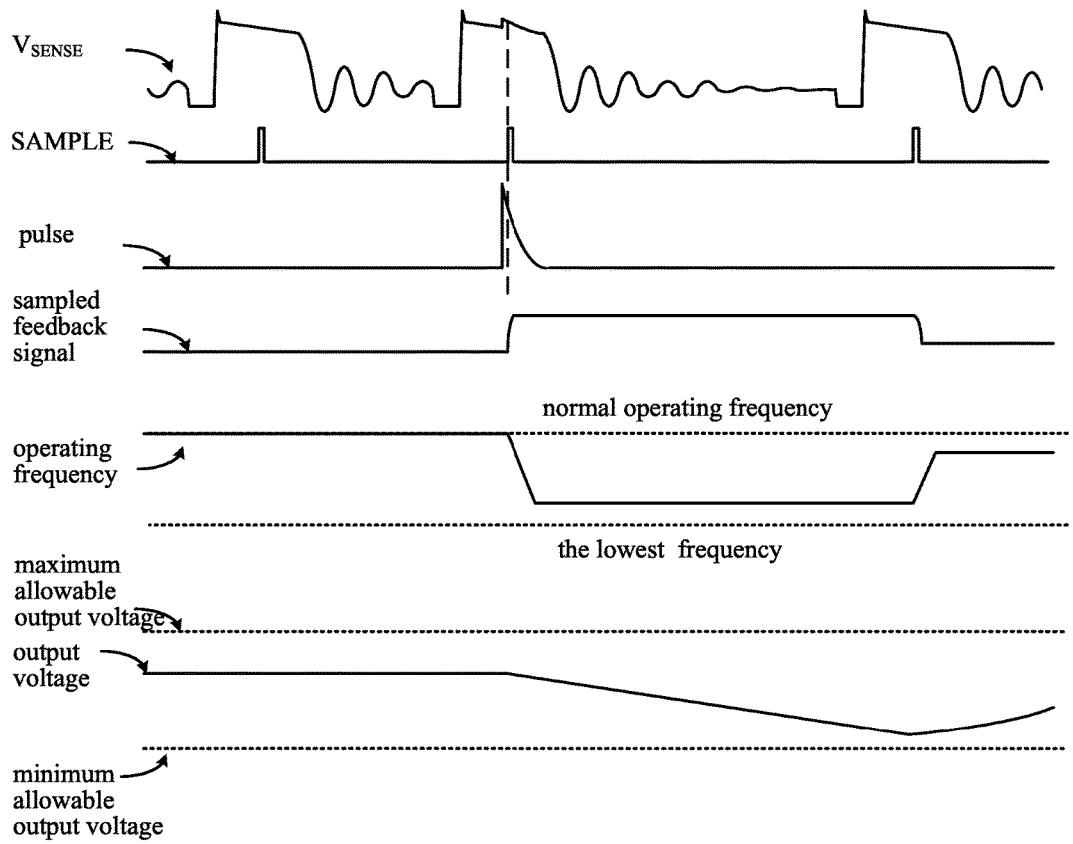
FIG. 4 is a schematic diagram illustrating the effects of the bursts of pulses on the chip during an EFT test.
Figure 5:
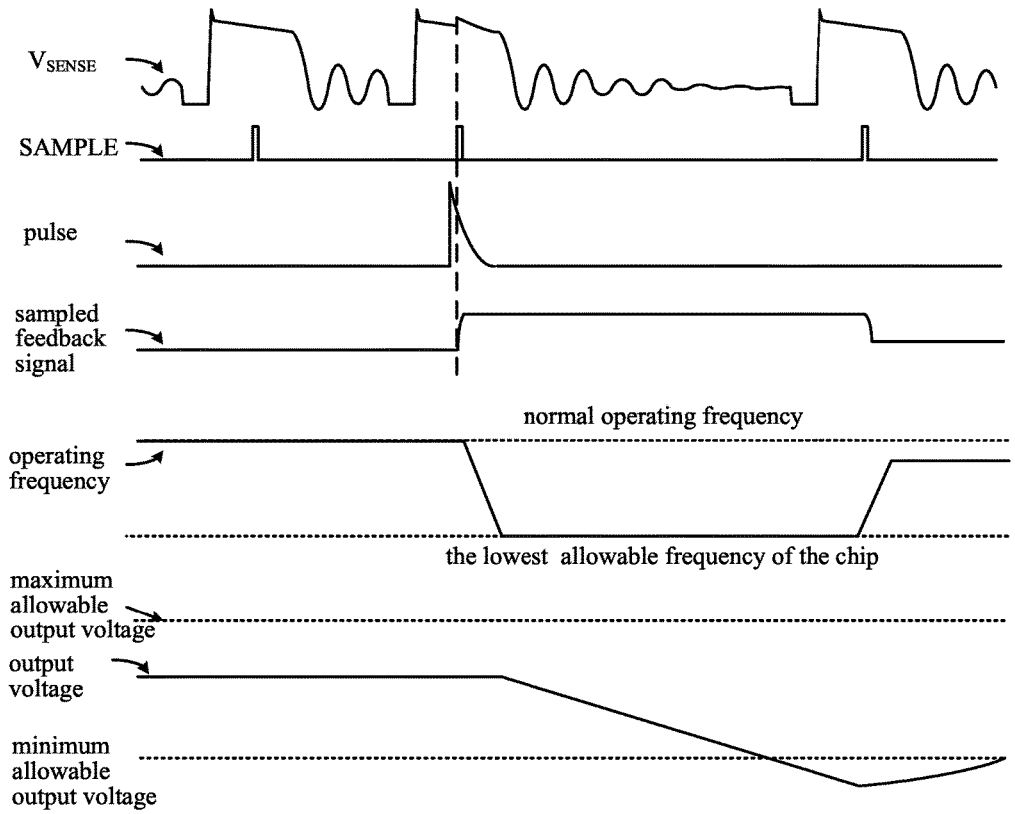
FIG. 5 is a schematic diagram illustrating that the bursts of pulses during an EFT test cause the output voltage to drop to values below the acceptable rang.
Figure 6:
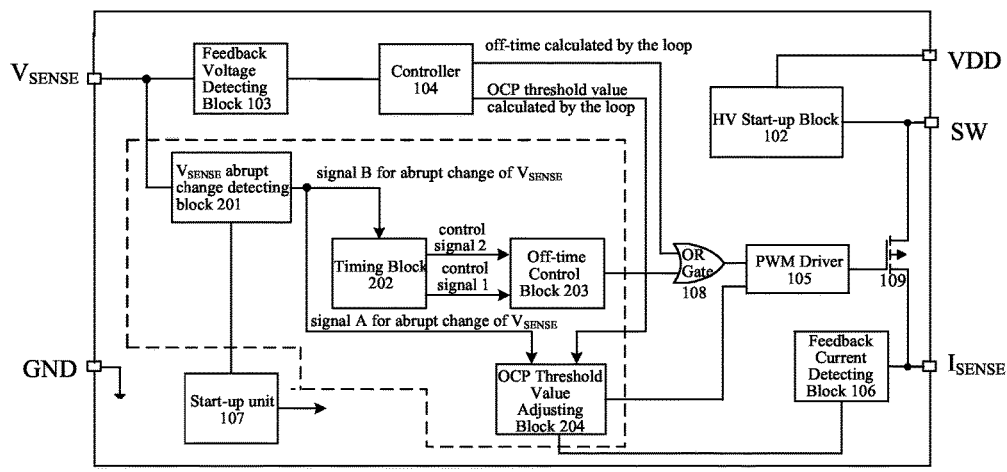
FIG. 6 is a schematic structure diagram of the power chip of the present disclosure.

As shown in FIG. 6, the circuit structure for enhancing EFT immunity of primary side converter comprises: a power ground and a feedback voltage detecting block 103, a feedback current detecting block 106, a controller 104, a PWM driver 105, a HV start-up block 102, a start-up unit 107, a circuit for enhancing EFT immunity of primary side converter, a power MOS transistor 109, and an OR gate 108 configured to perform a logical OR of the off-time calculated theoretically and the off-time output by an off-time control block 203.

The circuit for enhancing EFT immunity of primary side converter comprises: a $V_{SENSE}$ abrupt change detecting block 201 for detecting the abrupt change of the feedback voltage $V_{SENSE}$, the off-time control block 203, an OCP threshold value adjusting block 204 and a timing block 202.

An input of the $V_{SENSE}$ abrupt change detecting block 201 is connected with the $V_{SENSE}$ terminal, outputs of the $V_{SENSE}$ abrupt change detecting block 201 are respectively connected with an input of the start-up unit 107, an input of the OCP threshold value adjusting block 204 and an input of the timing block 202. Inputs of the off-time control block 203 are connected with outputs of the timing block 202, and an output of the off-time control block 203 is connected with an input of the OR gate 108. Another input of the OCP threshold value adjusting block 204 is connected with an output of the controller 104, and an output of the OCP threshold value adjusting block 204 is connected with an input of the feedback current detecting block 106.

An input of the feedback voltage detecting block 103 is connected with the $V_{SENSE}$ terminal, and an output of the feedback voltage detecting block 103 is connected with an input of the controller 104.

Outputs of the controller 104 are respectively connected with an input of the OCP threshold value adjusting block 204 and another input of the OR gate 108.

The output of the OR gate 108 is connected with an input of the PWM driver 105.

An output of the PWM driver 105 is connected with the gate of the power MOS transistor 109.

The drain of power MOS transistor 109 is connected with the HV start-up block 102 and a high voltage port SW; the source of power MOS transistor 109 is connected with the feedback current detecting block 106 and a current feedback port $I_{SENSE}$;

The feedback current detecting block 106 is also connected with the OCP threshold value adjusting block 204, and the current feedback port $I_{SENSE}$.

The HV start-up block 102 is respectively connected with the high voltage port SW and the power port VDD.

The feedback current detecting block 106 timely monitors the current of the primary side of the primary side when the power MOS transistor is on (conducting). The feedback voltage detecting block 103 timely monitors the feedback voltage when the power MOS transistor is off (non-conducting). The controller 104 calculates the on-time and the off-time of the power MOS transistor according to the feedback voltage and the feedback current. The circuit for enhancing EFT immunity of primary side converter selects the real off-time and real on-time of the power MOS transistor according to the signal of the feedback voltage $V_{SENSE}$, so as to ensure that the output voltage will not drop to a value below the acceptable range.

In the circuit for enhancing EFT immunity of primary side converter, after the start-up has been finished, the $V_{SENSE}$ abrupt change detecting block 201 begins to detect the value of feedback voltage $V_{SENSE}$ periodically. Once the detecting block 201 detects an abrupt change of the feedback voltage $V_{SENSE}$, it outputs a signal B or a signal A, which represents an abrupt change of the $V_{SENSE}$ value (the signal B represents an abrupt increase of the signal of the feedback voltage $V_{SENSE}$, and the signal A represents an abrupt decrease of the signal of the feedback voltage $V_{SENSE}$), so as to drive the timing block 202 to operate and control the output of the OCP threshold value adjusting block 204, and further control the output of the off-time control block 203. According to the selective output signal (signal B or signal A) of the $V_{SENSE}$ abrupt change detecting block 201, the off-time control block 203 outputs a signal of the off-time of the power MOS transistor 109 according to the output signals of the timing block 202, or the OCP threshold value adjusting block 204 outputs an OCP threshold value according to the output signals of the $V_{SENSE}$ abrupt change detecting block 201.

The $V_{SENSE}$ abrupt change detecting block 201 detects the value of the feedback voltage $V_{SENSE}$ periodically, and generates the signal A or the signal B for abrupt change of the $V_{SENSE}$ value according to the signal of the feedback voltage $V_{SENSE}$. When the detecting block 201 detects an abrupt decrease of the feedback voltage $V_{SENSE}$, the signal A for abrupt change of the $V_{SENSE}$ is reversed. When the detecting block 201 detects an abrupt increase of the feedback voltage $V_{SENSE}$, the signal B for abrupt change of the $V_{SENSE}$ is reversed.

The $V_{SENSE}$ abrupt change detecting block 201 controls the start-up unit 107. Before the chip finishes start-up completely, the detecting function of the $V_{SENSE}$ abrupt change detecting block 201 is de-activated, and no information of the feedback voltage $V_{SENSE}$ is detected, which enables the chip to start up normally.

The off-time control block 203 selects the value of the off-time of the chip according to the signal B for the abrupt change of the feedback voltage $V_{SENSE}$ as well as the control signals output by the timing block 202.

The timing block 202 comprises a first timer, a second timer, an $n^{th}$ timer, and so on. When the signal B for abrupt change of the feedback voltage $V_{SENSE}$ is reversed, the first timer starts to time, and the second timer is reset simultaneously; after timing for a period of time, the timing block 202 generates a control signal 1 to control the off-time control block 203. When the signal B for abrupt change of the feedback voltage $V_{SENSE}$ is restored to the initial value, the second timer starts to time; after timing for a period of time, the timing block 202 generates a control signal 2 to control the off-time control block 203, and the first timer is reset simultaneously.

The off-time control block 203 limits the maximum off-time of the current cycle according to the off-time of the previous cycle, not allowing any abrupt changes of the off-time. When the off-time calculated in the current cycle is larger than the allowable off-time, the off-time control block 203 outputs a high level, so as to turn on the power MOS transistor 109.

The off-time control block 203 selects the off-time of the chip according to the signals for abrupt change of the feedback voltage $V_{SENSE}$. When the control signal 2 generated by the timing block 202 is in effect, the maximum off-time is set to be the value $T_{off\_A}$; when the off-time is greater than $T_{off\_A}$, the off-time control block 203 outputs a high level, so as to turn on the power MOS transistor 109. When the control signal 1 generated by the timing block 202 is in effect, the maximum off-time is set to be the value $T_{off\_B}$. When the off-time is greater than $T_{off\_B}$, the off-time control block outputs a high level, so as to turn on the power MOS transistor 109. $T_{off\_A}$ is less than $T_{off\_B}$, and $T_{off\_B}$ is greater than the no load off-time calculated by the controller 104.

The off-time control block 203 selects the off-time of the chip according to the signal B of the abrupt change of the feedback voltage $V_{SENSE}$ and the control signal output by the timing block 202. When the signal B for abrupt change of the feedback voltage $V_{SENSE}$ is reversed and when the control signal 1 takes no effects, the off-time control block 203 set the maximum off-time to be the value $T_{off\_A}$; when the off-time is greater than $T_{off\_A}$, the off-time control block 203 outputs a high level, so as to turn on the power MOS transistor 109. When the signal B for abrupt change of the feedback voltage $V_{SENSE}$ is reversed and when the control signal 1 is in effect, the off-time control block 203 sets the maximum off-time to be the value $T_{off\_B}$; when the off-time is greater than $T_{off\_B}$, the off-time control block 203 outputs a high level, so as to turn on the power MOS transistor 109. When the signal B for abrupt change of the feedback voltage $V_{SENSE}$ is the initial value, the chip is in start-up or the off-time is less than the allowable value, the off-time control block 203 outputs a low level.

The OCP threshold value adjusting block 204 selects an OCP threshold value according to the signal A for abrupt change of the feedback voltage $V_{SENSE}$. When the signal A for abrupt change of the feedback voltage $V_{SENSE}$ is reversed, the OCP threshold value is latched to be the maximum threshold value, till the signal A for abrupt change of the feedback voltage $V_{SENSE}$ is restored to the initial value again. When the signal A for abrupt change of the feedback voltage $V_{SENSE}$ is restored to the initial value and when the chip is in start-up, the OCP threshold value control the block 204 to output the OCP threshold value calculated by the controller 104.

As the pin FB is a voltage feedback pin of the primary side converter, the disturbance on the pin FB may cause an error response of the power system and further cause an abnormal output. The EFT test for the power system is executed by adding a group of plus-minus pulse signals to the input alternating voltage, so as to cause abrupt changes of the input voltage. The abrupt changes of the input voltage are coupled into the pin FB to cause the abrupt changes of the signal of the feedback voltage $V_{SENSE}$. If the abrupt change point of $V_{SENSE}$ happens to be sampled by the chip, the chip samples the false $V_{SENSE}$ value and will make a wrong judgment, leading to an abnormal output. For example, when the pulse voltage is positive, the sampled value of $V_{SENSE}$ will increase abruptly, and according to the false value of $V_{SENSE}$, the chip will make a judgment to output an excessively high voltage, and decrease its output frequency which may be even less than the minimum allowable frequency, causing the output of the system to decrease greatly, even to be lower than the minimum allowable voltage.

According to the present invention, when the abrupt change of $V_{SENSE}$ is detected, the decrease of the output frequency of the chip is slowed down, so as to prevent the output from decreasing drastically; thereby, when the correct output voltage is detected, the chip can make a response quickly, which improves the dynamic response characteristics of the system. On the other hand, when the output voltage decreases, the chip detects whether the output voltage is lower than a certain value or not. If it is, the chip outputs larger energy, so as to ensure that the chip can restore the output to the preset value and that the output is kept in the allowable range all the time.

Figure 7:
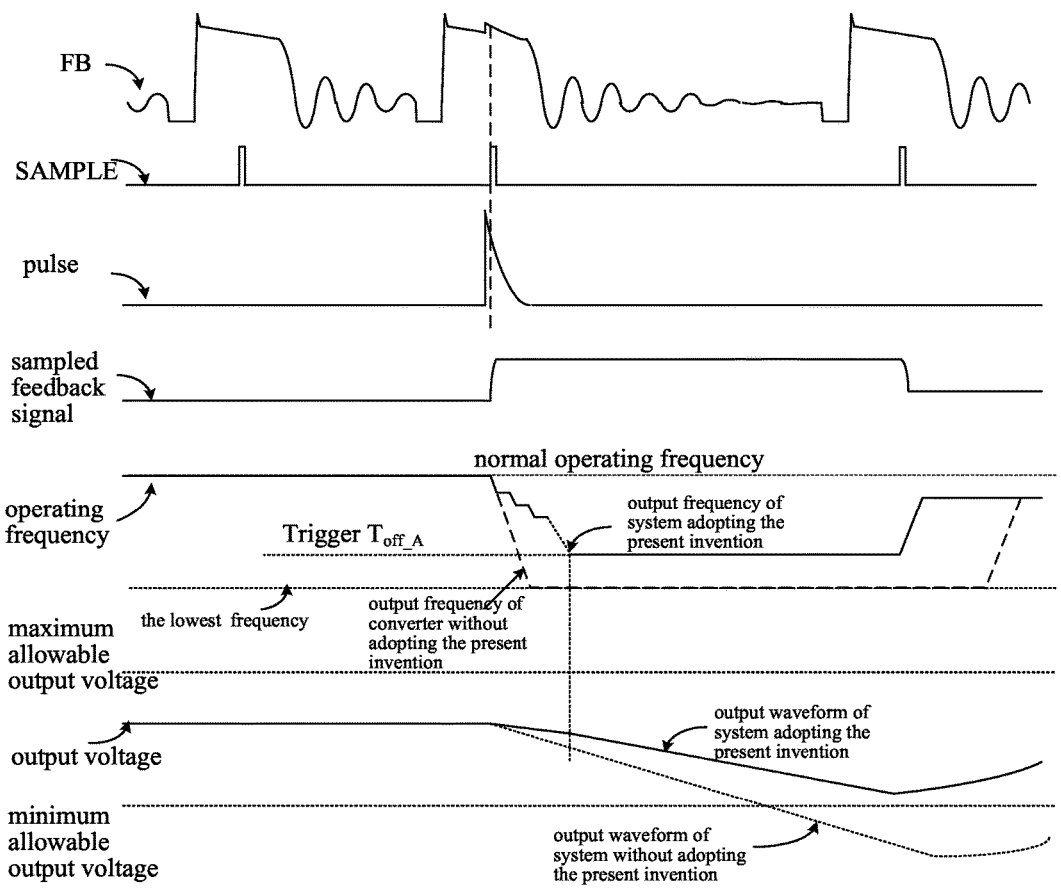
FIG. 7 is a schematic diagram illustrating the working waveforms of the converter of the present disclosure, which are generated when $V_{SENSE}$ has an abrupt increase during an EFT test.
Figure 8:
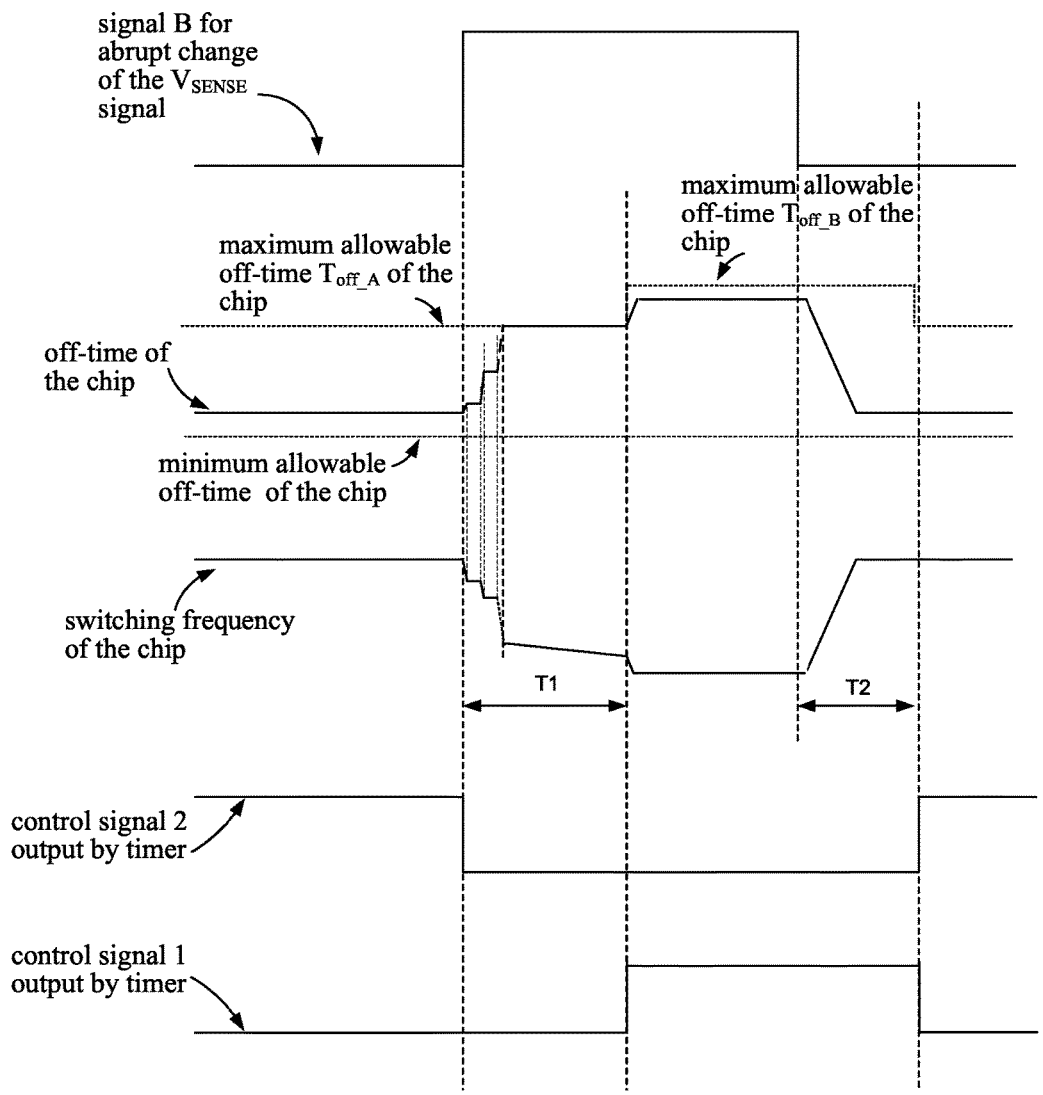
FIG. 8 is a schematic diagram illustrating the working waveforms of some signals in the circuit for enhancing EFT immunity of primary side converter when the $V_{SENSE}$ has an abrupt increase.

FIG. 7 illustrates the working waveforms of the system of the present disclosure, which are generated when the voltage $V_{SENSE}$ increases abruptly during an EFT test; FIG. 8 illustrates the working waveforms of some signals in the circuit for enhancing EFT immunity of primary side converter when the $V_{SENSE}$ abruptly increases. When the abrupt increasing of the $V_{SENSE}$ value is detected, the signal B for abrupt change of the feedback voltage $V_{SENSE}$ is set to be the high level (or the low level in some embodiments), and the first timer is controlled to start timing, and the control signal 2 output by the timing block 202 is set to be the low level simultaneously. When the time $T_1$ measured by the first timer expires, the maximum allowable off-time is changed from $T_{off\_A}$ to $T_{off\_B}$, wherein $T_{off\_B}$ is greater than $T_{off\_A}$. Generally, $T_{off\_A}$ is less than the off-time calculated by the controller when the chip is unloaded. At the beginning since the signal B for abrupt change of the feedback voltage $V_{SENSE}$ is reversed, and when the off-time calculated by the controller is greater than $T_{off\_A}$, the chip locks the off-time as $T_{off\_A}$, till the control signal 1 output by the timing block 202 is reversed.

When the signal B for abrupt change of the feedback voltage $V_{SENSE}$ is restored to the initial value, the second timer starts to time. When the time $T_2$ measured by the second timer expires, the control signal 2 is reversed, and the control signal 1 is set to be the initial value. When the control signal 2 is reversed, the maximum allowable off-time is changed from $T_{off\_B}$ to $T_{off\_A}$.

Figure 9:
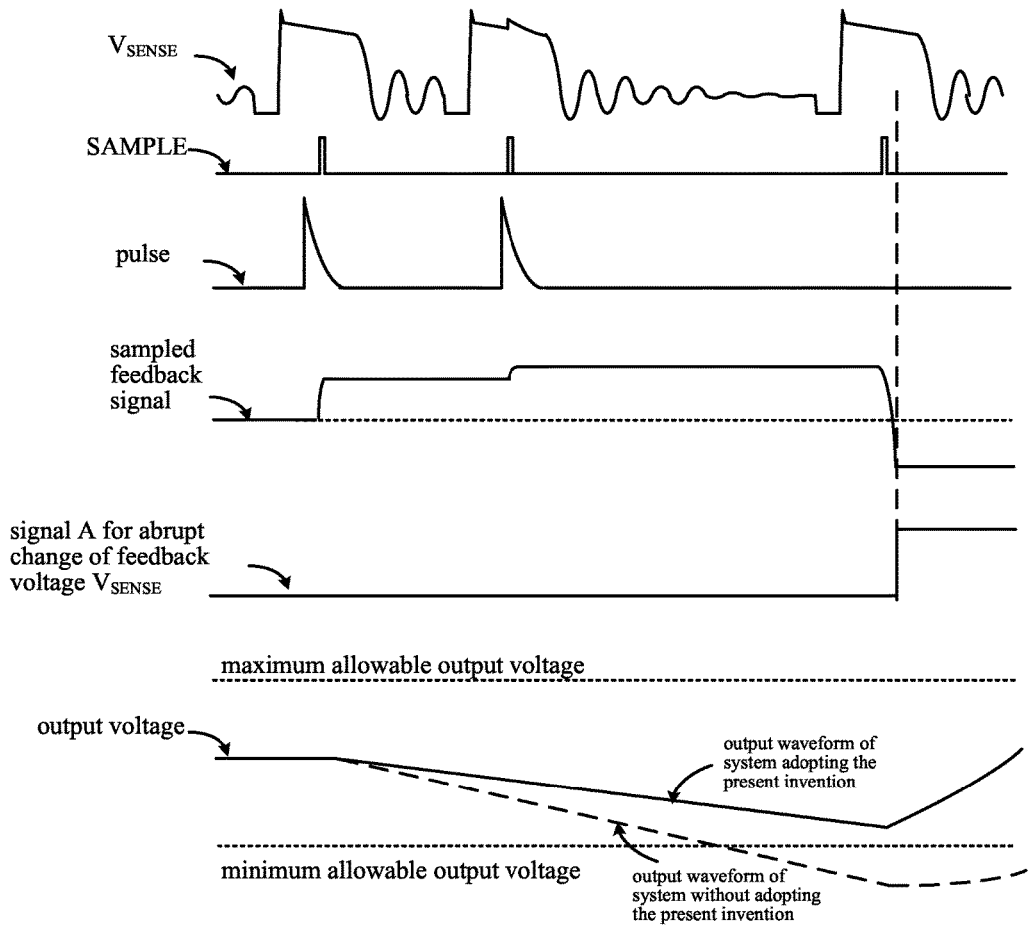
FIG. 9 is a schematic diagram illustrating the working waveforms of the converter of the present disclosure, which are generated when $V_{SENSE}$ has an abrupt decrease during an EFT test.
Figure 10:
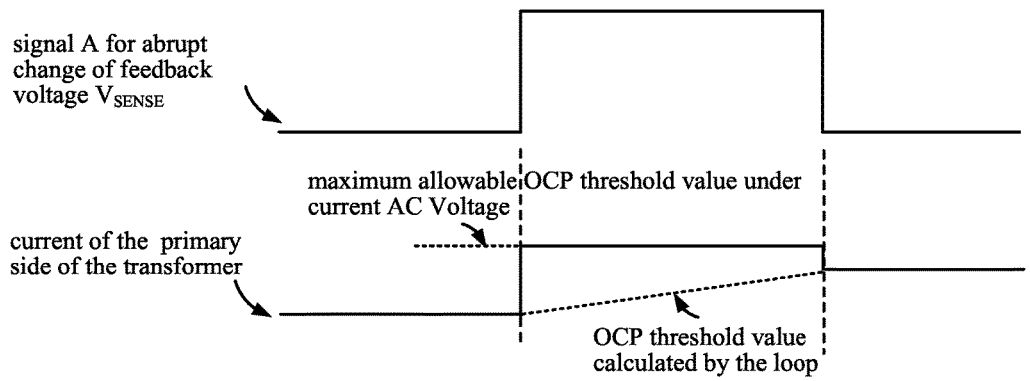
FIG. 10 is a schematic diagram illustrating the working waveforms of the OCP threshold value of the converter when $V_{SENSE}$ has an abrupt decrease.

FIG. 9 illustrates the working waveforms of the system of the present disclosure, which are generated when the voltage $V_{SENSE}$ abruptly decreases during an EFT test; FIG. 10 illustrates the working waveforms of the OCP threshold value when the voltage $V_{SENSE}$ abruptly decreases. When the abrupt decrease of $V_{SENSE}$ is detected, the signal A for abrupt change of the feedback voltage $V_{SENSE}$ is set to be a high level (or a low level in some embodiments), so as to control the OCP threshold value adjusting block 204 to output the maximum OCP threshold value under the current AC Voltage, and further to increase the output voltage rapidly till the signal A for abrupt change of the feedback voltage $V_{SENSE}$ is reversed to the initial value. Namely, when the output voltage is restored to the initial value, the OCP threshold value control block 204 outputs the OCP threshold value calculated by the controller 104.

Figure 11:
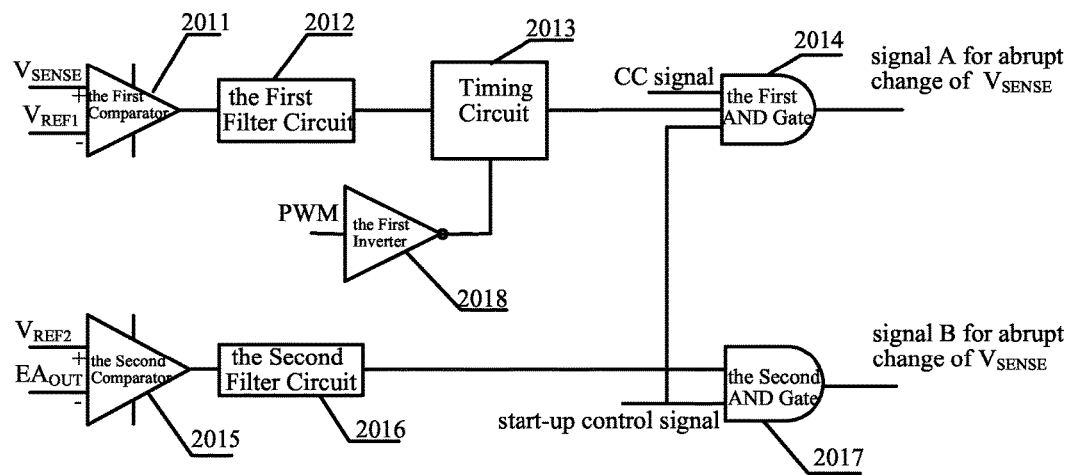
FIG. 11 is a schematic circuit principle diagram of the block for detecting the abrupt change of $V_{SENSE}$.

As shown in FIG. 11, the $V_{SENSE}$ abrupt change detecting block 201 comprises a first comparator 2011, a second comparator 2015, a first filter circuit 2012, a second filter circuit 2016, a timing circuit 2013, a first inverter 2018, a first AND gate 2014 and a second AND gate 2017. Inputs of the first comparator 2011 are respectively connected with the reference voltage $V_{REF1}$ terminal and the feedback voltage $V_{SENSE}$ terminal, an output of the first comparator 2011 is connected with the first filter circuit 2012. An output of the first filter circuit 2012 is connected with an input of the timing circuit 2013, also the timing circuit 2013 is connected with the first inverter 2018 and the first AND gate 2014, also the first AND gate 2014 is respectively connected with a CC signal terminal and a start-up control signal terminal. Inputs of the second comparator 2015 are respectively connected with the terminal of the output signal $EA_{OUT}$ of an operating amplifier and the reference voltage $V_{REF2}$ terminal, an output of the second comparator 2015 is connected with the second filter circuit 2016. The second AND gate 2017 is respectively connected with the start-up control signal terminal and the second filter circuit 2016. The first comparator 2011 receives the feedback voltage signal and the reference voltage $V_{REF1}$, and generates the comparison signal 1. The first filter circuit 2012 filters out disturbances from the comparison signal 1. According to the comparison signal 1 having been filtered and the PWM signal, the timing circuit 2013 times the time width, in which the feedback voltage is greater than the reference voltage. The timing circuit 2013 compares the time width with a threshold. If the time width is less than the threshold, the output of the timing circuit is set to be a high level. The first AND gate 2014 generates the signal A for abrupt change of feedback voltage $V_{SENSE}$ according to the CC signal, the output level of the timing circuit and the start-up control signal. The second comparator 2015 receives the output signal $EA_{OUT}$ of the operating amplifier and the reference voltage $V_{REF2}$, and generates the comparison signal 2. The second filter circuit 2016 filters out disturbances from the comparison signal 2. The second AND gate 2017 generates the signal B for abrupt change of feedback voltage $V_{SENSE}$ according to the start-up control signal and the comparison signal 2. When the chip finishes start-up, and when the time width, in which the signal of $V_{SENSE}$ is greater than the reference voltage $V_{REF1}$, is less than the threshold, the output is judged to have an abrupt decrease and the signal A for abrupt change of $V_{SENSE}$ is set to be a high level. When the output signal $EA_{OUT}$ of the operating amplifier is less than the reference voltage $V_{REF2}$, the output is judged to have an abrupt increase and the signal B for abrupt change of feedback voltage $V_{SENSE}$ is set to be a high level.

Figure 12:
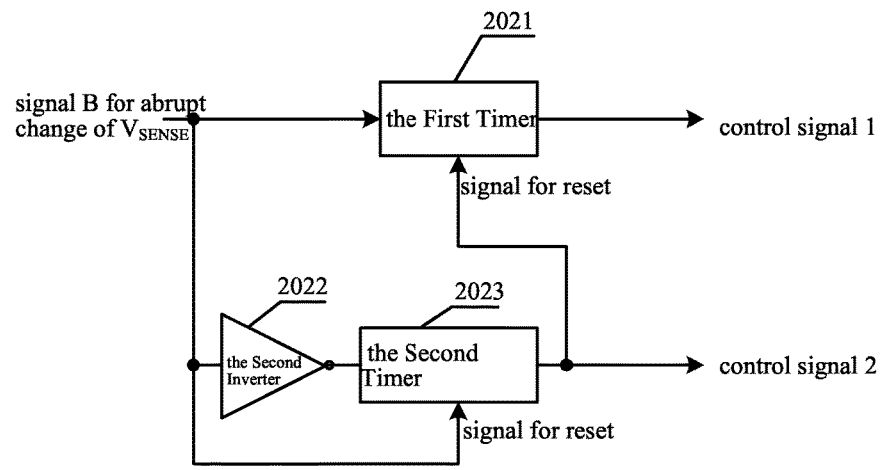
FIG. 12 is a schematic circuit principle diagram of the timing block.

As shown in FIG. 12, the timing block 202 comprises a first timer 2021, a second timer 2023, and a second inverter 2022. The first timer 2021 receives the signal B for abrupt change of feedback voltage $V_{SENSE}$ and the control signal 2. The second timer 2023 receives the output signal of the second inverter 2022 and the signal B for abrupt change of feedback voltage $V_{SENSE}$. According to the signal B for abrupt change of feedback voltage $V_{SENSE}$, the timing block generates the control signal 1 and the control signal 2, so as to control the operation of the off-time control block 203.

Figure 13:
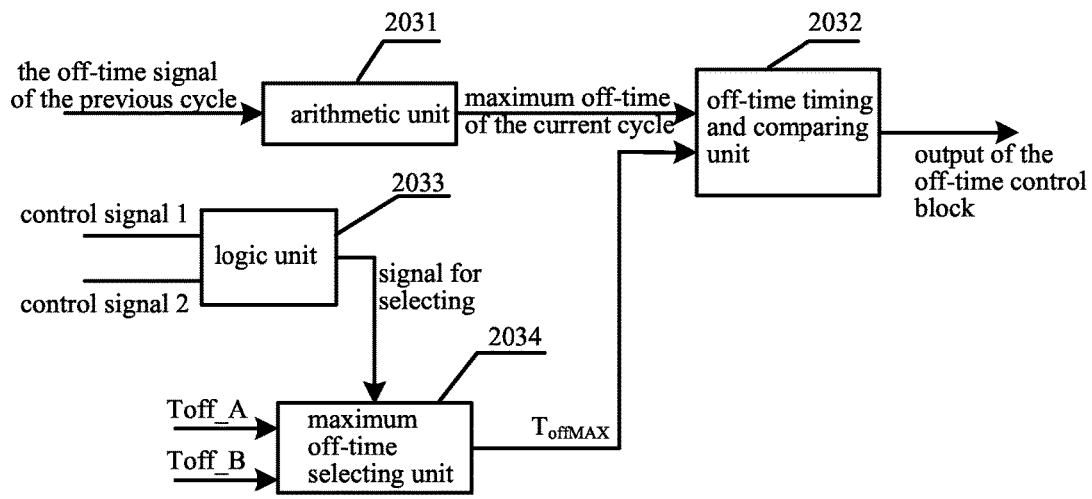
FIG. 13 is a schematic circuit principle diagram of the block for controlling the off-time $T_{off}$.

As shown in FIG. 13, the off-time control block 203 comprises an arithmetic unit 2031, a logic unit 2033, a maximum off-time selecting unit 2034, and an off-time timing and comparing unit 2032. An input of the arithmetic unit 2031 is connected with the terminal of the off-time signal of the previous cycle, and an output of the arithmetic unit 2031 is connected with an input of the off-time timing and comparing unit 2032. Inputs of the logic unit 2033 are connected with the control signal 1 and the control signal 2, and an output of the logic unit 2033 is connected with an input of the maximum off-time selecting unit 2034. Inputs of the maximum off-time selecting unit 2034 are connected with the terminal of the signal $T_{off\_B}$ and the terminal of the signal $T_{off\_A}$, and an output of the maximum off-time selecting unit 2034 is connected with an input of the off-time timing and comparing unit 2032. The off-time timing and comparing unit 2032 selects the minor value from the off-time output by the arithmetic unit 2031 and the maximum off-time output by the maximum off-time selecting unit 2034. The selected minor value is selected to be the output signal of the off-time control block 203. In this way, the off-time is selected according to the control signals output by the timing block.

Figure 14:
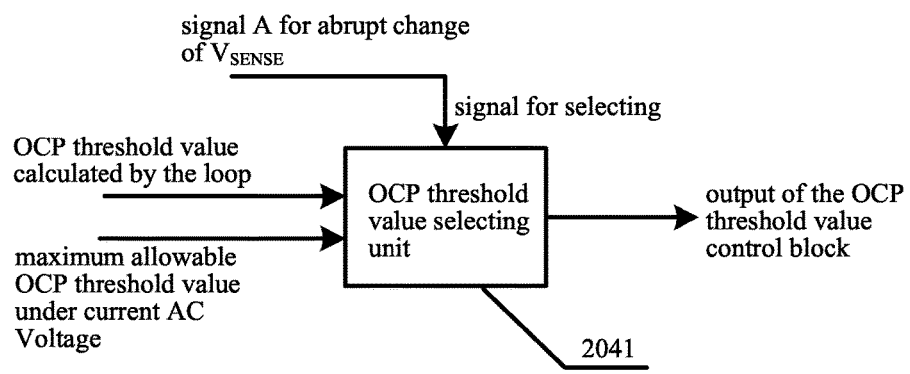
FIG. 14 is a schematic circuit principle diagram of the block for controlling the threshold value of the Over Current Protection (OCP).

As shown in FIG. 14, the OCP threshold value adjusting block 204 comprises the OCP threshold value selecting unit 2041. According to the signal A for abrupt change of the feedback voltage $V_{SENSE}$, the OCP threshold value selecting unit 2041 selects the OCP threshold value calculated by the feedback loop or the maximum allowable OCP threshold value under the current AC Voltage, and the selected value is output by the OCP threshold value adjusting block. In this way, the OCP threshold value is selected according to the signal A for abrupt change of the feedback voltage $V_{SENSE}$.

As can be seen from above, the power system provided with the primary side feedback based power chip of the present disclosure has an effectively enhanced EFT immunity, as well as improved dynamic responses, and effectively enhanced anti-interference performances for various kinds of transient disturbances caused by transient processes during operations, such as turning on or turning off an inductive load, contact bounce of a relay, and so on. The signal of the feedback voltage $V_{SENSE}$ is detected periodically, which ensures that the power chip can make a timely response to changes of $V_{SENSE}$ and that the output voltage is always within the acceptable range. The off-time and the on-time are controlled by a specific control block, which speeds up the response of the chip and effectively improves the dynamic characteristics. During the starting-up, the circuit for enhancing EFT immunity of primary side converter is shielded, which ensures that the power converter starts up normally. The circuit for enhancing EFT immunity of primary side converter is applicable not only to the power chip with integrated power MOS transistor, but also to the power chip with integrated power BJT, the power chip with externally driven power MOS transistor or the power chip with externally driven power BJT.

It should be understood by those skilled in the art that what described above are preferred embodiments of the present invention, various improvement and modifications may be made therein without departing from the scope of the present invention.

We claim:

1. A circuit structure for enhancing EFT immunity of primary side converter, comprising:
a power ground and a feedback voltage detecting block (103), a feedback current detecting block (106), a controller (104), a PWM driving block (105), a HV start-up block (102), a start-up unit (107), a circuit for enhancing EFT immunity of primary side converter, a power MOS transistor (109), and an OR gate (108) configured to perform a logical operation OR of an off-time calculated theoretically and an off-time output by an off-time control block (203);
wherein, the circuit for enhancing EFT immunity of primary side converter comprises a $V_{SENSE}$ abrupt change detecting block (201), the off-time control block (203), an OCP threshold value adjusting block (204) and a timing block (202);
wherein, an input of the $V_{SENSE}$ abrupt change detecting block (201) is connected with a feedback voltage $V_{SENSE}$ terminal, outputs of the $V_{SENSE}$ abrupt change detecting block (201) are respectively connected with an input of the start-up unit (107), an input of the OCP threshold value adjusting block (204) and an input of the timing block (202); inputs of the off-time control block (203) are connected with outputs of the timing block (202), and an output of the off-time control block (203) is connected with an input of the OR gate (108); another input of the OCP threshold value adjusting block (204) is connected with an output of the controller (104), and an output of the OCP threshold value adjusting block (204) is connected with an input of the feedback current detecting block (106);
an input of the feedback voltage detecting block (103) is connected with the $V_{SENSE}$ terminal, and an output of the feedback voltage detecting block (103) is connected with an input of the controller (104);

outputs of the controller (104) are respectively connected with an input of the OCP threshold value adjusting block (204) and another input of the OR gate (108);
an output of the OR gate (108) is connected with an input of the PWM driver (105);
an output of the PWM driver (105) is connected with an input of the power MOS transistor(109);
the drain of power MOS transistor (109) is connected with the HV start-up block (102) and a high voltage port SW; the source of power MOS transistor (109) is connected with the feedback current detecting block (106) and a current feedback port $I_{SENSE}$;
the feedback current detecting block (106) is also connected with the OCP threshold value adjusting block (204), and a current feedback port $I_{SENSE}$;
the HV start-up block (102) is respectively connected with the high voltage port SW and a power port VDD;
the off-time control block (203) comprises an arithmetic unit (2031), a logic unit (2033), a maximum off-time selecting unit (2034) and an off-time timing and comparing unit (2032); an output of the arithmetic unit (2031) is connected with an input of the off-time timing and comparing unit (2032); an output of the logic unit (2033) is connected with an input of the maximum off-time selecting unit (2034); an output of the maximum off-time selecting unit (2034) is connected with another input of the off-time timing and comparing unit (2032);
the off-time timing and comparing unit (2032) is configured to select a minor value from an off-time output by the arithmetic unit (2031) and maximum off-time output by the maximum off-time selecting unit (2034); and the minor value is selected to be output signal of the off-time control block (203).

2. The circuit structure according to claim 1, wherein, the feedback current detecting block (106) is configured to timely monitor current of the primary side when the power MOS transistor (109) is on; the feedback voltage detecting block (103) is configured to timely monitor feedback voltage $V_{SENSE}$ when the MOS power transistor (109) is off; the controller (104) is configured to calculate on-time and off-time of the power MOS transistor according to the feedback voltage and feedback current; the circuit for enhancing EFT immunity of primary side converter is configured to select real off-time and on-time of the power MOS transistor (109) according to the feedback voltage $V_{SENSE}$;
the circuit for enhancing EFT immunity of primary side converter is configured so that, after start-up has been finished, the $V_{SENSE}$ abrupt change detecting block (201) begins to detect signals of feedback voltage $V_{SENSE}$ periodically, once an abrupt change of the feedback voltage $V_{SENSE}$ is detected, it outputs a signal B representing an abrupt increase of the feedback voltage $V_{SENSE}$ or a signal A representing an abrupt decrease of the feedback voltage $V_{SENSE}$, so as to drive the timing block (202) to operate, and control outputs from the OCP threshold value adjusting block (204), and further control outputs from the off-time control block (203); according to selective output signals of the $V_{SENSE}$ abrupt change detecting block (201), the off-time control block (203) outputs a signal of the off-time of the power MOS transistor (109) according to the output signals of the timing block (202), or the OCP threshold value adjusting block (204) outputs an OCP threshold value according to the output signals of the $V_{SENSE}$ abrupt change detecting block (201).

3. A circuit structure for enhancing EFT immunity of primary side converter, comprising:
- a power ground and a feedback voltage detecting block (103), a feedback current detecting block (106), a controller (104), a PWM driving block (105), a HV start-up block (102), a start-up unit (107), a circuit for enhancing EFT immunity of primary side converter, a power MOS transistor (109), and an OR gate (108) configured to perform a logical operation OR of an off-time calculated theoretically and an off-time output by an off-time control block (203);
- wherein, the circuit for enhancing EFT immunity of primary side converter comprises a $V_{SENSE}$ abrupt change detecting block (201), the off-time control block (203), an OCP threshold value adjusting block (204) and a timing block (202);
- wherein, an input of the $V_{SENSE}$ abrupt change detecting block (201) is connected with a feedback voltage $V_{SENSE}$ terminal, outputs of the $V_{SENSE}$ abrupt change detecting block (201) are respectively connected with an input of the start-up unit (107), an input of the OCP threshold value adjusting block (204) and an input of the timing block (202); inputs of the off-time control block (203) are connected with outputs of the timing block (202), and an output of the off-time control block (203) is connected with an input of the OR gate (108); another input of the OCP threshold value adjusting block (204) is connected with an output of the controller (104), and an output of the OCP threshold value adjusting block (204) is connected with an input of the feedback current detecting block (106);
- an input of the feedback voltage detecting block (103) is connected with the $V_{SENSE}$ terminal, and an output of the feedback voltage detecting block (103) is connected with an input of the controller (104);
- outputs of the controller (104) are respectively connected with an input of the OCP threshold value adjusting block (204) and another input of the OR gate (108);
- an output of the OR gate (108) is connected with an input of the PWM driver (105);
- an output of the PWM driver (105) is connected with an input of the power MOS transistor (109);
- the drain of power MOS transistor (109) is connected with the HV start-up block (102) and a high voltage port SW; the source of power MOS transistor (109) is connected with the feedback current detecting block (106) and a current feedback port $I_{SENSE}$;
- the feedback current detecting block (106) is also connected with the OCP threshold value adjusting block (204), and a current feedback port $I_{SENSE}$;
- the HV start-up block (102) is respectively connected with the high voltage port SW and a power port VDD;
- wherein, the feedback current detecting block (106) is configured to timely monitor current of the primary side when the power MOS transistor (109) is on; the feedback voltage detecting block (103) is configured to timely monitor feedback voltage $V_{SENSE}$ when the MOS power transistor (109) is off; the controller (104) is configured to calculate on-time and off-time of the power MOS transistor according to the feedback voltage and feedback current; the circuit for enhancing EFT immunity of primary side converter is configured to select real off-time and on-time of the power MOS transistor (109) according to the feedback voltage $V_{SENSE}$;
- the circuit for enhancing EFT immunity of primary side converter is configured so that, after start-up has been finished, the $V_{SENSE}$ abrupt change detecting block (201) begins to detect signals of feedback voltage $V_{SENSE}$ periodically, once an abrupt change of the feedback voltage $V_{SENSE}$ is detected, it outputs a signal B representing an abrupt increase of the feedback voltage $V_{SENSE}$ or a signal A representing an abrupt decrease of the feedback voltage $V_{SENSE}$, so as to drive the timing block (202) to operate, and control outputs from the OCP threshold value adjusting block (204), and further control outputs from the off-time control block (203); according to selective output signals of the $V_{SENSE}$ abrupt change detecting block (201), the off-time control block (203) outputs a signal of the off-time of the power MOS transistor(109) according to the output signals of the timing block (202), or the OCP threshold value adjusting block (204) outputs an OCP threshold value according to the output signals of the $V_{SENSE}$ abrupt change detecting block (201);
- wherein, the timing block (202) comprises a plurality of timers including at least a first timer and a second timer; when the signal B is reversed, the first timer starts to time, and the second timer is reset simultaneously, after timing for a period of time, the timing block (202) generates a control signal 1 to control the off-time control block (203); when the signal B is restored to its initial value, the second timer starts to time, after timing for a period of time, the timing block (202) generates a control signal 2 to control the off-time control block (203), and the first timer is reset simultaneously.

4. A circuit structure according for enhancing EFT immunity of primary side converter, comprising:
- a power ground and a feedback voltage detecting block (103), a feedback current detecting block (106), a controller (104), a PWM driving block (105), a HV start-up block (102), a start-up unit (107), a circuit for enhancing EFT immunity of primary side converter, a power MOS transistor(109), and an OR gate (108) configured to perform a logical operation OR of an off-time calculated theoretically and an off-time output by an off-time control block (203);
- wherein, the circuit for enhancing EFT immunity of primary side converter comprises a $V_{SENSE}$ abrupt change detecting block (201), the off-time control block (203), an OCP threshold value adjusting block (204) and a timing block (202);
- wherein, an input of the $V_{SENSE}$ abrupt change detecting block (201) is connected with a feedback voltage $V_{SENSE}$ terminal, outputs of the $V_{SENSE}$ abrupt change detecting block (201) are respectively connected with an input of the start-up unit (107), an input of the OCP threshold value adjusting block (204) and an input of the timing block (202); inputs of the off-time control block (203) are connected with outputs of the timing block (202), and an output of the off-time control block (203) is connected with an input of the OR gate (108); another input of the OCP threshold value adjusting block (204) is connected with an output of the controller (104), and an output of the OCP threshold value adjusting block (204) is connected with an input of the feedback current detecting block (106);
- an input of the feedback voltage detecting block (103) is connected with the $V_{SENSE}$ terminal, and an output of the feedback voltage detecting block (103) is connected with an input of the controller (104);

outputs of the controller (104) are respectively connected with an input of the OCP threshold value adjusting block (204) and another input of the OR gate (108);

an output of the OR gate (108) is connected with an input of the PWM driver (105);

an output of the PWM driver (105) is connected with an input of the power MOS transistor (109);

the drain of power MOS transistor (109) is connected with the HV start-up block (102) and a high voltage port SW; the source of power MOS transistor (109) is connected with the feedback current detecting block (106) and a current feedback port $I_{SENSE}$;

the feedback current detecting block (106) is also connected with the OCP threshold value adjusting block (204), and a current feedback port $I_{SENSE}$;

the HV start-up block (102) is respectively connected with the high voltage port SW and a power port VDD;

wherein, the feedback current detecting block (106) is configured to timely monitor current of the primary side when the power MOS transistor (109) is on; the feedback voltage detecting block (103) is configured to timely monitor feedback voltage $V_{SENSE}$ when the MOS power transistor (109) is off; the controller (104) is configured to calculate on-time and off-time of the power MOS transistor according to the feedback voltage and feedback current; the circuit for enhancing EFT immunity of primary side converter is configured to select real off-time and on-time of the power MOS transistor (109) according to the feedback voltage $V_{SENSE}$;

the circuit for enhancing EFT immunity of primary side converter is configured so that, after start-up has been finished, the $V_{SENSE}$ abrupt change detecting block (201) begins to detect signals of feedback voltage $V_{SENSE}$ periodically, once an abrupt change of the feedback voltage $V_{SENSE}$ is detected, it outputs a signal B representing an abrupt increase of the feedback voltage $V_{SENSE}$ or a signal A representing an abrupt decrease of the feedback voltage $V_{SENSE}$, so as to drive the timing block (202) to operate, and control outputs from the OCP threshold value adjusting block (204), and further control outputs from the off-time control block (203); according to selective output signals of the $V_{SENSE}$ abrupt change detecting block (201), the off-time control block (203) outputs a signal of the off-time of the power MOS transistor(109) according to the output signals of the timing block (202), or the OCP threshold value adjusting block (204) outputs an OCP threshold value according to the output signals of the $V_{SENSE}$ abrupt change detecting block (201);

wherein, the off-time control block (203) is configured to select the off-time of the power MOS transistor (109) according to the signal B, the off-time of a previous cycle, and control signals output by the timing block (202); the off-time control block (203) limits the maximum off-time of current cycle according to the off-time of the previous cycle, not allowing any abrupt change of the off-time; when the off-time calculated in the current cycle is larger than an allowable off-time, the off-time control block outputs a high level, so as to turn on the power MOS transistor (109); the off-time control block (203) selects the maximum off-time of the power chip according to signals for abrupt change of the feedback voltage $V_{SENSE}$;

when a control signal 2 generated by the timing block (202) is in effect, the maximum off-time is set to be the value Toff_A; when the off-time is greater than Toff_A, the off-time control block (203) outputs a high level, so as to turn on the power MOS transistor (109); when a control signal 1 generated by the timing block (202) is in effect, the maximum off-time is to be the value Toff_B; when the off-time is greater than Toff_B, the off-time control block outputs a high level, so as to turn on the power MOS transistor (109); Toff_A is less than Toff_B; and Toff_B is greater than the no load off-time calculated by the controller (104); when the signal B is an initial value, and when the circuit structure is in start-up and the off-time is less than the allowable off-time, the off-time control block (203) outputs a low level.

5. A circuit structure for enhancing EFT immunity of primary side converter, comprising:

a power ground and a feedback voltage detecting block (103), a feedback current detecting block (106), a controller (104), a PWM driving block (105), a HV start-up block (102), a start-up unit (107), a circuit for enhancing EFT immunity of primary side converter, a power MOS transistor (109), and an OR gate (108) configured to perform a logical operation OR of an off-time calculated theoretically and an off-time output by an off-time control block (203);

wherein, the circuit for enhancing EFT immunity of primary side converter comprises a $V_{SENSE}$ abrupt change detecting block (201), the off-time control block (203), an OCP threshold value adjusting block (204) and a timing block (202);

wherein, an input of the $V_{SENSE}$ abrupt change detecting block (201) is connected with a feedback voltage $V_{SENSE}$ terminal, outputs of the $V_{SENSE}$ abrupt change detecting block (201) are respectively connected with an input of the start-up unit (107), an input of the OCP threshold value adjusting block (204) and an input of the timing block (202); inputs of the off-time control block (203) are connected with outputs of the timing block (202), and an output of the off-time control block (203) is connected with an input of the OR gate (108); another input of the OCP threshold value adjusting block (204) is connected with an output of the controller (104), and an output of the OCP threshold value adjusting block (204) is connected with an input of the feedback current detecting block (106);

an input of the feedback voltage detecting block (103) is connected with the $V_{SENSE}$ terminal, and an output of the feedback voltage detecting block (103) is connected with an input of the controller (104);

outputs of the controller (104) are respectively connected with an input of the OCP threshold value adjusting block (204) and another input of the OR gate (108);

an output of the OR gate (108) is connected with an input of the PWM driver (105);

an output of the PWM driver (105) is connected with an input of the power MOS transistor (109);

the drain of power MOS transistor (109) is connected with the HV start-up block (102) and a high voltage port SW; the source of power MOS transistor (109) is connected with the feedback current detecting block (106) and a current feedback port $I_{SENSE}$;

the feedback current detecting block (106) is also connected with the OCP threshold value adjusting block (204), and a current feedback port $I_{SENSE}$;

the HV start-up block (102) is respectively connected with the high voltage port SW and a power port VDD;

wherein, the feedback current detecting block (106) is configured to timely monitor current of the primary side when the power MOS transistor (109) is on; the feedback voltage detecting block (103) is configured to timely monitor feedback voltage $V_{SENSE}$ when the MOS power transistor (109) is off; the controller (104) is configured to calculate on-time and off-time of the power MOS transistor according to the feedback voltage and feedback current; the circuit for enhancing EFT immunity of primary side converter is configured to select real off-time and on-time of the power MOS transistor (109) according to the feedback voltage $V_{SENSE}$;

the circuit for enhancing EFT immunity of primary side converter is configured so that, after start-up has been finished, the $V_{SENSE}$ abrupt change detecting block (201) begins to detect signals of feedback voltage $V_{SENSE}$ periodically, once an abrupt change of the feedback voltage $V_{SENSE}$ is detected, it outputs a signal B representing an abrupt increase of the feedback voltage $V_{SENSE}$ or a signal A representing an abrupt decrease of the feedback voltage $V_{SENSE}$, so as to drive the timing block (202) to operate, and control outputs from the OCP threshold value adjusting block (204), and further control outputs from the off-time control block (203); according to selective output signals of the $V_{SENSE}$ abrupt change detecting block (201), the off-time control block (203) outputs a signal of the off-time of the power MOS transistor(109) according to the output signals of the timing block (202), or the OCP threshold value adjusting block (204) outputs an OCP threshold value according to the output signals of the $V_{SENSE}$ abrupt change detecting block (201);

wherein the $V_{SENSE}$ abrupt change detecting block (201) comprises a first comparator (2011), a second comparator (2015), a first filter circuit (2012), a second filter circuit (2016), a timing circuit (2013), a first inverter (2018), a first AND gate (2014) and a second AND gate (2017); an output of the first comparator (2011) is connected with the first filter circuit (2012); an output of the first filter circuit (2012) is connected with an input of the timing circuit (2013), also the timing circuit (2013) is connected with the first inverter (2018) and the first AND gate (2014); an output of the second comparator (2015) is connected with the second filter circuit (2016); an output of the second filter circuit (2016) is connected with the second AND gate (2017);

the first comparator (2011) is configured to receive the feedback voltage and generate a comparison signal 1;

the first filter circuit (2012) is configured to filter out disturbances from the comparison signal 1;

the timing circuit (2013) is configured to time the time width according to the filtered comparison signal 1 and a PWM signal, in which the feedback voltage is greater than the reference voltage; the timing circuit (2013) is configured to compare the time width with a threshold, if the time width is less than the threshold, the output of the timing circuit (2013) is set to be a high level;

the first AND gate (2014) is configured to generate the signal A according to the signal CC, output level of the timing circuit (2013) and a start-up control signal;

the second comparator (2015) is configured to receive an output signal $EA_{OUT}$ of an operating amplifier and the reference voltage $V_{REF2}$, and generate a comparison signal 2;

the second filter circuit (2016) is configured to filter out disturbances from the comparison signal 2;

the second AND gate (2017) is configured to generate the signal B according to the start-up control signal and the comparison signal 2.

* * * * *